United States Patent [19]

Udd et al.

[11] Patent Number: 4,743,116
[45] Date of Patent: May 10, 1988

[54] MICROBENDING OPTICAL FIBER ACCELEROMETER AND GYROSCOPE

[76] Inventors: Eric Udd, 14311 Tropicana La., Huntington Beach, Calif. 92647; Philip M. Gretzkowski, 31 Greenbough, Irvine, Calif. 92714; Keith H. Wanser, 17604 'A' Van Buren, Huntington Beach, Calif. 92647

[21] Appl. No.: 785,335

[22] Filed: Oct. 7, 1985

[51] Int. Cl.⁴ .............................................. G01B 9/02
[52] U.S. Cl. ...................................... 356/350; 250/227
[58] Field of Search ........................... 356/72, 350, 32; 250/227; 73/488, 517 AB; 324/96

[56] References Cited
U.S. PATENT DOCUMENTS 4,342,907  8/1982  Macedo et al. ................... 356/32 X
4,345,482  8/1982  Adolfsson et al. ............. 250/277 X
4,452,531  6/1984  Person ............................ 356/350 X

FOREIGN PATENT DOCUMENTS 0135816  7/1985  Japan ................................. 356/350

Primary Examiner—Eugene R. LaRoche
Assistant Examiner—Robert J. Pascal

[57] ABSTRACT

There is provided by this invention a fiber optic transducer for accelerometers and gyroscopes that utilize microbending of an optical fiber between two suspended points by vibrating the optical fiber with electro-static deflection to induce modulation of a light signal to sense acceleration, tension, etc. The amplitude modulation of the light signal induced by the bending lost in the vibrating fiber is demodulated with respect to reference signals to derive an output proportional to acceleration, tension, or other environmental factors.

27 Claims, 4 Drawing Sheets

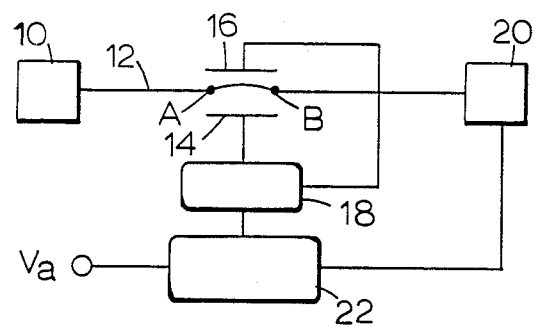
fig.1
fig.2
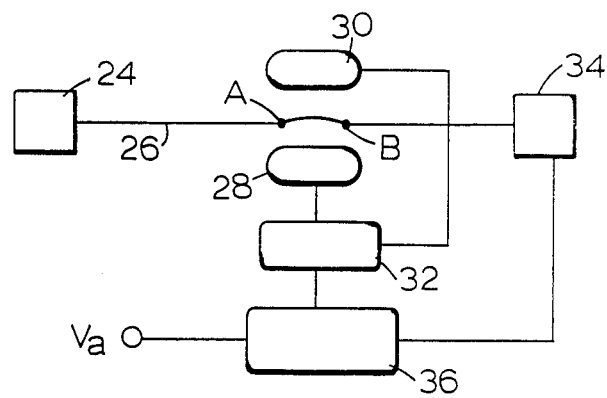
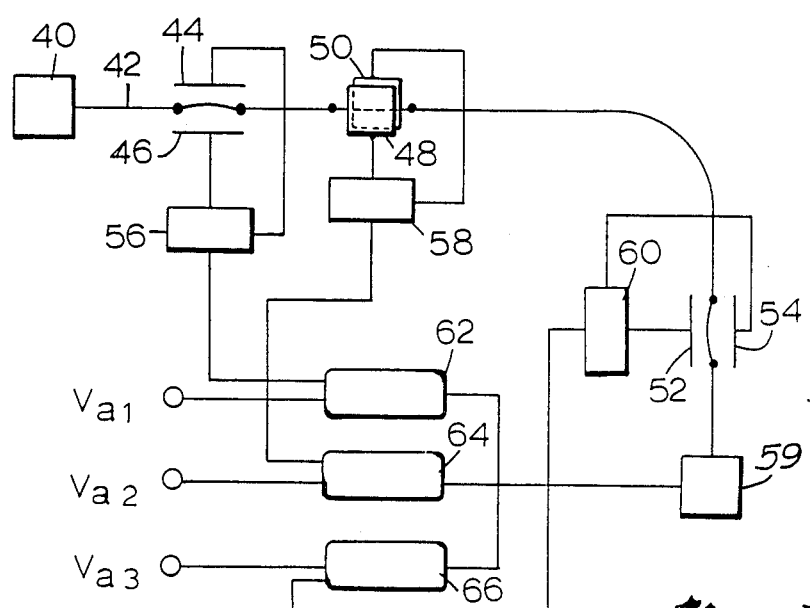
fig.3

MICROBENDING OPTICAL FIBER ACCELEROMETER AND GYROSCOPE

BACKGROUND OF THE INVENTION

1. Field of the Invention

This invention relates generally to solid state accelerometers and gyroscopes for guidance and control systems, and more particularly to solid state accelerometers and gyroscopes that utilize fiber optical transducers and modulators.

2. Description of the Prior Art

Cost, performance limitations, and reliability problems of mechanical gyros and accelerometers have stimulated the development of solid state fiber optic gyros. Presently, ring laser gyros have demonstrated reliable performance and have been widely accepted as the state of the art in gyroscope technology for high performance applications. However, ring laser gyros are not completely solid state and require large and costly high quality optical components. Although investigators have been increasing the effectiveness and reliability of ring laser gyros, no genuine breakthrough in a low cost solid state gyro with wide dynamic range capability has occurred using the ring laser gyro concept.

A completely solid state fiber optical gyro having a wide dynamic range was disclosed in U.S. Pat. No. 4,299,490, issued to Richard F. Cahill, et al on Nov. 10, 1981 entitled "Phase Nulling Optical Gyro" and assigned to the assignee of the instant application. This patent advanced the fiber optic gyro technology by allowing the fiber optical gyro to have performance characteristics similar to those of the ring laser gyro while maintaining the advantages of a solid state embodiment.

It is an object of this invention to add accelerometer capabilities to guidance and control systems having a frequency output scheme that is compatible with demodulation methods used in fiber optical gyros such as the one described in the reference patent. Another object of this invention is to allow accelerometers to be multiplexed with the fiber optical gyros to form a multisensor capable of measuring both acceleration and rotation.

SUMMARY OF THE INVENTION

There is provided by this invention a solid state device for measuring acceleration in guidance and control systems having a fiber optic modulator that is comprised generally of an optical fiber suspended between two points under tension and vibrated at a frequency 'f'. In one embodiment the fiber is vibrated between two electrodes by means of electrostatic deflection or coated with a magnetic material and vibrated in a magnetic field. When means of electrostatic deflection or coated with a magnetic material and vibrated in a magnetic field. When the device is accelerated, the deflection of the vibrating fiber is asymmetrical and the light passing through the fiber is amplitude modulated at frequency f and odd harmonics of f. The first and odd harmonic amplitude modulation has an amplitude proportional to the acceleration and a phase relative to the driving signal that depends on the direction of acceleration.

BRIEF DESCRIPTION OF THE DRAWINGS

FIG. 1 is a microbending fiber optic accelerometer utilizing electrostatic deflection;

FIG. 2 is a microbending fiber optic accelerometer utilizing magnetic deflection;

FIG. 3 is a multiple axis accelerometer incorporating the principles of this invention;

BRIEF DESCRIPTION OF THE PREFERRED EMBODIMENT

Figure 4:
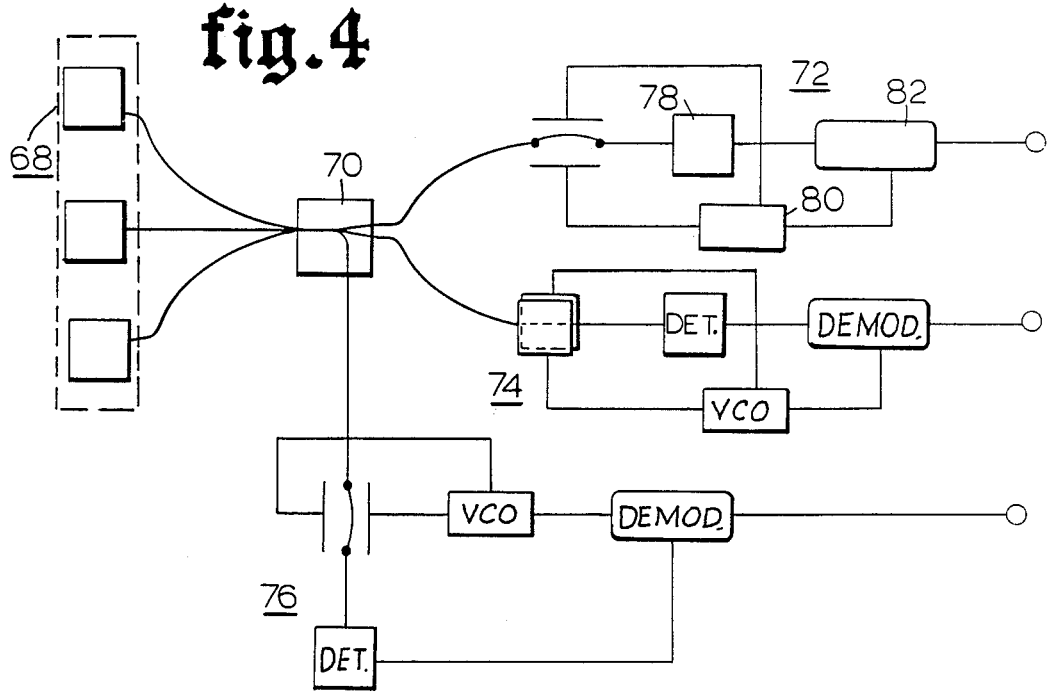
FIG. 4 illustrates a modification of the embodiment shown in FIG. 1 where multiple vibrating fiber accelerometers can be multiplexed for multiple axes.

FIG. 1 illustrates an embodiment of a microbending fiber optic accelerometer utilizing electrostatic deflection of the optical fiber. A light source 10 which could be a light emitting diode or superradiant diode inputs a light beam into an optical fiber 12. The optical fiber 12 is suspended between two suspension points A and B under tension. The optical fiber 12 is movably fixed between two capacitive electrodes 14 and 16 so that its longitudinal axis is parallel to the plane of the electrodes. The optical fiber may be a fiber having a generally flat configuration that restrains the motion of the fiber in a single plane. Application of an ac voltage source 18 to the electrodes creates an electric field which emerges normal to the surface of the higher potential and terminates normal to the surface of the lower potential. The optical fiber, being of dielectric material, a dipole moment induced in it which is drawn towards the regions of higher electric field. The ac voltage source 18 causes the fiber to oscillate at a frequency f. The output of the vibrating fiber 12 is connected to a detector 20 and synchronous demodulator 22.

An alternative means of electrostatically driving the fiber involves applying a conductive coating to the fiber region being deflected. By oscillating the potential on the coating in the presence of an electric field created by the capacitive plates the fiber may be vibrated. Similarly, the potential of the conductively coated fiber may be held fixed and the electric field oscillated.

FIG. 2 illustrates an embodiment of a microbending fiber optic accelerometer utilizing magnetic deflection of the optical fiber. A light source 24 which could be a light emitting diode or superradiant diode inputs a light signal into an optical fiber 26. The optical fiber 26 is suspended between two suspension points A and B under tension. The fiber 26 is magnetically coated between the suspension points A and B with a magnetic material such as ferrous oxide. The optical fiber 26 is movably fixed between two coils 28 and 30. Application of an ac source 32 to the coils creates a magnetic field which oscillates the magnetically coated fiber at a frequency f. The output of the vibrating fiber 26 is connected to a detector 34 and synchronous demodulator 36.

Figure 2A:
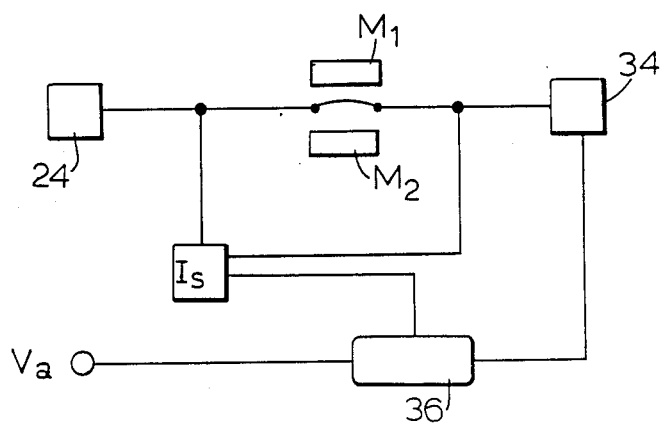
FIG. 2A illustrates a microbending fiber optic accelerometer using magnetic deflection between permanent magnets.

An alternate means of magnetically driving the fiber optic accelerometer is to utilize permanent magnets instead of the coils 28 and 30 and a driving current through a conductively coated fiber placed between the magnets for oscillation. Such a modification is shown in FIG. 2A where a conductively coated fiber is suspended between two magnetic poles, $M_1$ and $M_2$, and connected to an oscillating current, $i_s$.

When the fiber is driven at a frequency f, in the absence of acceleration, the signal output $V_a$ of the system will be at 2f and other even harmonics. This output signal is an amplitude modulation based on induced bending loss in the fiber. Upon acceleration the deflection becomes asymmetric and the output of the system will contain f and higher order odd harmonics. The first harmonic signal f occurs with an amplitude dependent upon the magnitude of the acceleration and a phase dependent on direction. In FIGS. 1 and 2, the signal output received by detectors 20 and 34 are synchronously demodulated by circuits 22 and 36 with respect to reference signals and a voltage $V_a$ proportional to acceleration results.

Referring to FIG. 3 there is shown an accelerometer having three orthogonal sensing axes. A light source 40 inputs a light beam into the optical fiber 42. Pairs of electrodes 44, 46, 48, 50, 52, and 54 are aligned orthogonally to each other. Oscillators 56, 58, and 60 modulate the fibers in the manner previously described. Each oscillator vibrates the fiber at a different frequency chosen so that harmonic interference between adjacent units does not occur. Each signal which is generated on the detector 59 is synchronously demodulated by circuits 62, 64, and 66. Outputs $V_{a1}$, $V_{a2}$, and $V_{a3}$ represent acceleration components in each of the sensing axes. Electronic filtering may be provided to avoid cross coupling effects.

FIG. 4 illustrates a modification of the embodiment shown in FIG. 1 where the beam from the light source 68 which may utilize redundant sources for greater reliability and enhanced performance is split by a beam splitter 70 into a multiple of inputs for several vibrating fiber accelerometer loops representing different axes that can be multiplexed. Each of the vibrating fiber accelerometer loops 72, 74, and 76 have voltage oscillators, detectors, and demodulators circuits such as 78, 80, and 82 as described in FIG. 1 and are multiplexed for output information for the various axes.

Figure 5:
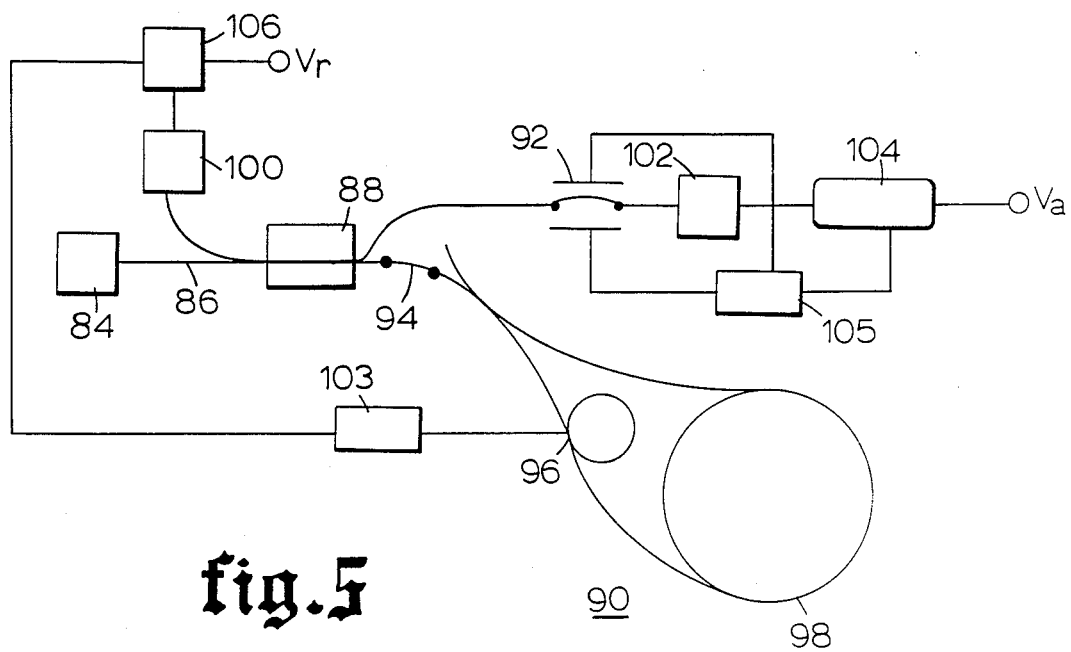
FIG. 5 is a microbending fiber optic gyro and accelerometer combination incorporating the principles of this invention.

FIG. 5 illustrates an embodiment of a microbending fiber optic gyro having an accelerometer incorporated therein. A light source 84 which could be a light emitting diode or superradiant diode inputs a light signal into an optical fiber 86 in the direction of a first beam splitter 88. For high performance applications, the light source may be a pigtailed superradiant laser diode having a thermoelectric cooler circuit controller. One output of the beam splitter 88 is fed to a gyro loop 90 and the other output is fed to an optical fiber accelerometer 92. The accelerometer loop 92 operates in a similar manner as the accelerometer shown in FIG. 1. The gyro loop is comprised of a polarizing optical fiber 94 connecting the light beam to a central beamsplitter 95, a piezoelectric phase modulator driver 96 and fiber coil 98. If the phase modulator 96 is driven at a frequency f by the oscillator 103 and the vibrating fiber accelerometer 92 is driven at a frequency w by the oscillator 105, in the absence of rotation and acceleration, the output of the system will be at 2f and other even harmonics and higher harmonics of 2w. Upon rotation the output of the system will contain f and higher odd harmonics, as well as various harmonics of w. Upon acceleration there will also be a w term and higher order harmonics proportional to acceleration. Since the rotation rate can be determined from the magnitude and phase of f, a rotationally induced portion of the w terms can be subtracted out so that only the amount attributable to acceleration remains. Detectors 100 and 102 are added to gyro and accelerometer loops, respectively. Utilizing synchronous demodulator circuits 104 and 106, in combination with the oscillators 103 and 105 output voltages are generated that are proportional to rotation, $V_r$, and acceleration, $V_a$. The accelerometer may be easily incorporated into many other fiber-optic gyro configurations by utilizing the extra output port of the first beamsplitter such as 88 as a light source.

Figure 6:
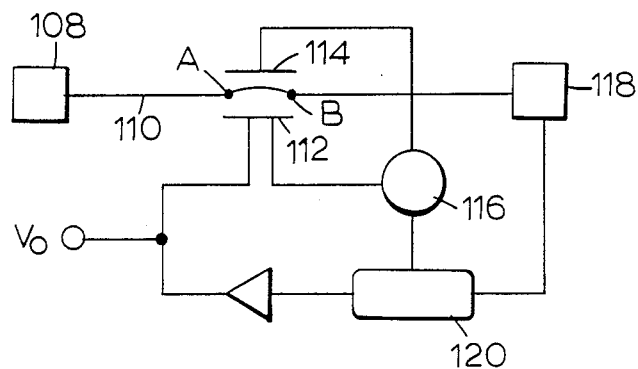
FIG. 6 is a closed loop rebalanced microbending fiber-optic accelerometer using electrostatic deflection.

The optical fiber accelerometers that have been described thus far are open loop devices. When acceleration causes an asymmetric deflection of the fiber under vibration the resulting odd harmonic signal of the drive frequency is used to determine the magnitude and direction of acceleration. Under ideal conditions this procedure would be adequate, but in high performance applications, nonlinearities in the system and cross coupling may degrade the signal. These problems may be reduced by employing a closed loop rebalancing technique illustrated by FIG. 6. A light source 108 inputs a light beam into an optical fiber 110. The optical fiber 110 is again suspended between two suspension points A and B under tension and is movably fixed between two electrodes 112 and 114. The ac voltage source 116 causes the fiber to oscillate at a frequency f. The output of the vibrating fiber 110 is connected to a detector 118 and synchronous demodulator 120. The output of the synchronous demodulator 120 is fed back to the capacitive plates. In this case the deflection due to acceleration is counterbalanced by a deflection due to a potential difference between the capacitive plates. The voltage required to null out the acceleration induced deflection of the fiber is the output, $V_o$, of the device.

The fiber-optic accelerometers described above operate most effectively under constant tension conditions for the suspended movable vibrating fiber. Changing resonance conditions due to tension changes will result in scale factor changes. This can be minimized by using constant tension designs for suspending the movable fiber and/or by selection of off resonance operating conditions.

Figure 7:
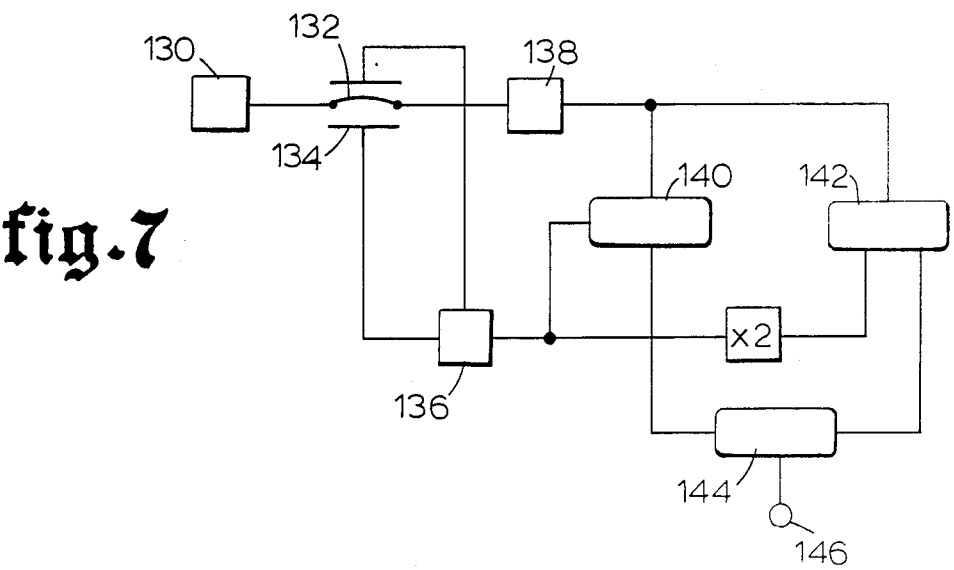
FIG. 7 illustrates a fiber optic accelerometer with a normalization circuit for tension effects.

A simple normalization scheme may be used to correct for scale factor changes as is shown in FIG. 7. This circuit consists of the light source 130, the suspended fiber 132, capacitive plates 134 driven by the oscillating source 136, and detector 138. A first harmonic synchronous demodulator 140 is connected to the detector 138 output in parallel with a second harmonic synchronous demodulator 142 for scale factor correction. Each demodulator is connected to a normalization circuit 144 that provides a normalized output 146. Here the second harmonic of the drive frequency f is used as a normalization factor for the signal at frequency f. Other even harmonics could also be used to normalize odd harmonic signals as an output.

Figure 8:
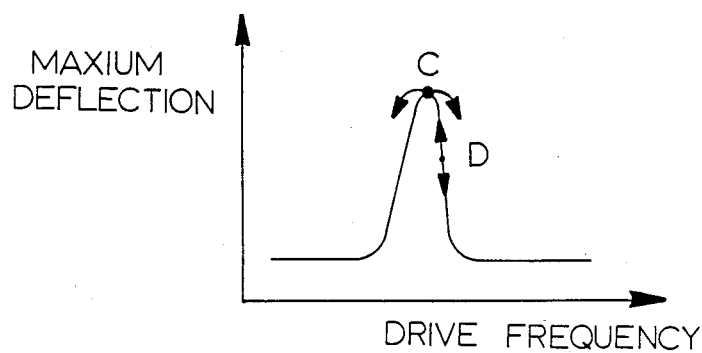
FIG. 8 illustrates the deflection of the fiber as a function of the drive frequency.

The resonant frequencies of the suspended movable fiber under tension are given by $W_n = n(\tau)^{\frac{1}{2}}$ where $(\tau)$ is the tension on the fiber and n is the order of the resonance. FIG. 8 illustrates that as the drive frequency changes and moves through resonance the deflection of the fiber reaches a peak.

Figure 9:
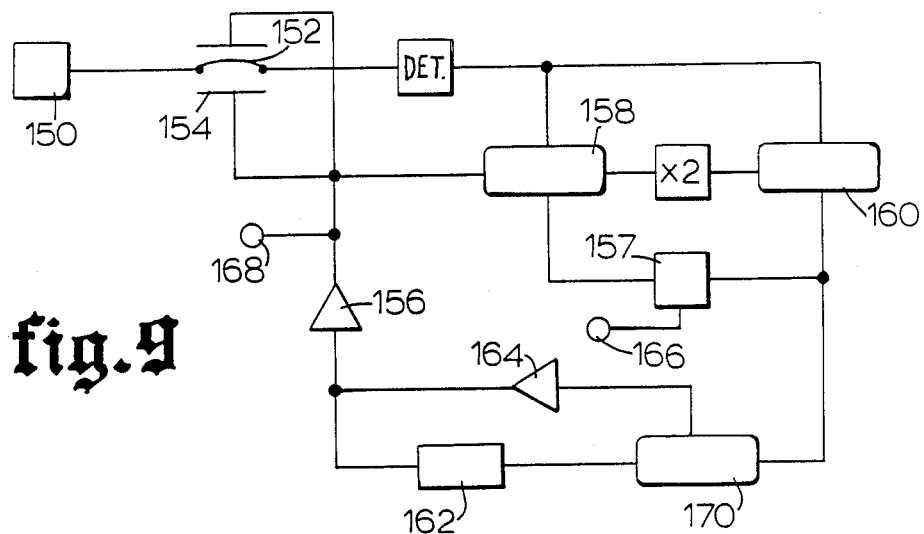
FIG. 9 illustrates a fiber optic accelerometer with a normalization circuit having a scale factor correction oscillator.

Now suppose the drive frequency is oscillated in a sinusoidal fashion at frequency S about the peak resonant point C shown in FIG. 8. The circuit shown in FIG. 9 illustrates a means to track the tension changes in the accelerometer. It consists of a light source 150, suspended fiber 152, electrical plates 154, and voltage controlled oscillator 156 connected to first and second harmonic synchronous demodulators 158 and 160. A scale factor correction oscillator 162 generates a voltage signal of frequency S which is used to oscillate the center drive frequency of the voltage controlled oscillator 156. As the tension changes, the operating condition will move off this peaked condition to a new position say D in FIG. 8. In this case a first harmonic signal S will occur whose amplitude is indication of the tension change and where phase depends upon whether the tension increased or decreased. This signal is detected by a synchronous demodulater 170 which applies a voltage to the integrator 164 which controls the voltage controlled oscillator 156 adjusting the drive frequency to be peaked at the resonance of the suspended fiber. A normalized output is provided at 166 by the normalization circuit 157. Tension may be monitored at output 168 as the frequency output of the voltage controlled oscillator and may be used to correct scale factor or in a closed loop to maintain a constant tension on the movable fiber.

It is also possible to use this technique to create an entire class of fiber-optic sensors which monitor environmental effects that cause the suspension points to change the tension on the movable fiber.

Another method of detection would be a counterbalance the acceleration induced deflection by an adjusted dc magnetic field. The current required to null out the acceleration induced deflection of the fiber is the output of the device.

Although there has been illustrated and described specific detail and structure of operation, it is clearly understood that the same were merely for purposes of illustration and that changes and modifications may be readily made therein by those skilled in the art without departing from the spirit and scope of this invention.

We claim:

1. A solid state accelerometer, comprising:
    (a) a light source means for providing a light beam input;
    (b) an optical fiber connected to the light source means for receiving the light beam input;
    (c) a support means for suspending the optical fiber between two points under a predetermined tension;
    (d) a vibrating means for vibrating the optical fiber at a frequency f between the two points of the support means; and
    (e) a detection means for detecting acceleration induced amplitude modulation of the light beam at the output of the optical fiber including electrical circuitry means for indicating the quantity of acceleration present.

2. A solid state accelerometer as recited in claim 1 wherein the optical fiber has a generally flat configuration to confine the motion of the fiber to a single plane.

3. A solid state accelerometer, comprising:
    (a) a light source means for providing a light beam input;
    (b) an optical fiber connected to the light source means for receiving the light beam input;
    (c) a support means for suspending the optical fiber between two points under a predetermined tension;
    (d) a pair of electrodes mounted in close proximity to the optical fiber such that the longitudal axis of the optical fiber is within the plane of the electrodes;
    (e) an oscillating voltage means connected to the pair of electrodes for vibrating the optical fiber at a frequency f between the two points of the support means; and
    (f) a detection means for detecting acceleration induced amplitude modulation of the light beam at the output of the optical fiber including electrical circuitry means for indicating the quantity of acceleration present.

4. A solid state accelerometer as recited in claim 3 wherein the optical fiber has a generally flat configuration to confine the motion of the fiber to a single plane.

5. A solid state accelerometer, comprising:
    (a) a light source means for providing a light beam input;
    (b) a magnetically coated optical fiber connected to the light source means for receiving the light beam input;
    (c) a support means for suspending the magnetically coated optical fiber between two points under a predetermined tension;
    (d) a pair of coils each mounted on opposite sides of the optical fiber between the two points of predetermined tension;
    (e) an oscillating voltage means connected to the pair of coils for vibrating the optical fiber at a frequency f between the two points of the support means; and
    (f) a detection means for detecting acceleration induced amplitude modulation of the light beam at the output of the optical fiber including electrical circuitry means for indicating the quantity of acceleration present.

6. A solid state accelerometer as recited in claim 5 wherein the magnetically coated optical fiber has a generally flat configuration to confine the motion of the fiber to a single plane.

7. A solid state accelerometer and fiber optic gyro combination, comprising:
    (a) a light source means for producing a beam of light;
    (b) a first beam splitting means for splitting the beam of light into a path comprising a gyro loop and a path comprising an accelerometer loop;
    (c) a second beam splitting means for splitting the beam of light in the gyro loop into second and third beams of light and recombining the second and third beams into a fourth beam of light;
    (d) an optical fiber loop connected to the second beam splitting means for directing the second and third beams of light in opposite directions along a path about a predetermined axis about which rotation is to be measured in a counterpropagating light path for the second and third light beams;
    (e) a first sensing optical fiber wound in a coil about a predetermined axis for establishing the counterpropagating light path about which rotation is to be measured, the optical fiber having first and second ends, and coupling means for applying the second and third beams of light to the first and second fiber ends respectively;

(f) a phase modulator means connected to the optical fiber loop for creating a nonreciprocal phase shift between the second and third light beams;

(g) a second sensing optical fiber connected to the first beam splitting means comprising the accelerometer loop;

(h) a pair of electrodes mounted in close proximity to the second sensing optical fiber such that the longitudal axis of the fiber is within the plane of the electrodes;

(i) an oscillating voltage means connected to the pair of electrodes for vibrating the second sensing optical fiber at a frequency f between the two points of the support means; and (j) a detection means for detecting rotation and acceleration induced amplitude modulation of the light beams in the first and second sensing optical fibers including electrical circuitry means for indicating the quantity of rotation and acceleration present as a function of amplitude.

8. A solid state accelerometer as recited in claim 7 wherein the second sensing optical fiber has a generally flat configuration to confine the motion of the fiber to a single plane.

9. A solid state accelerometer, comprising:
(a) a light source means for providing a light beam input;
(b) an optical fiber connected to the light source means for receiving the light beam input;
(c) a beam splitter connected to the optical fiber for splitting the light beam input into a plurality of light beams;
(d) a plurality of optical fibers connected to the beam splitter for receiving the plurality of light beams;
(e) a plurality of support means for suspending each of the plurality of optical fibers between two points under a predetermined tension;
(f) a plurality of electrodes having a oscillating voltage connected thereto for vibrating each of the plurality of optical fibers at a frequency f between the two points of the support means; and
(g) a detection means for detecting acceleration induced amplitude modulation of the plurality of light beams at the output of the plurality of optical fibers including electrical circuitry means for indicating the quantity of acceleration present as a function of amplitude.

10. A solid state accelerometer as recited in claim 9 wherein the plurality of optical fibers have a generally flat configuration to confine the motion of the fiber to a single plane.

11. A solid state accelerometer, comprising:
(a) a light source means for providing a light beam input;
(b) an optical fiber connected to the light source means for receiving the light beam input;
(c) a plurality of support means for suspending the optical fiber between multiple points of the fiber under a predetermined tension;
(d) a plurality of electrodes having an oscillating voltage connected thereto for vibrating the optical fiber in orthogonal planes at a frequency f between the multiple points of the plurality of support means; and
(e) a detection means for detecting acceleration induced amplitude modulation of the light beam at the output of the optical fiber including electrical circuitry means for indicating the quantity of acceleration present as a function of amplitude.

12. A solid state accelerometer as recited in claim 11 wherein the optical fiber has a generally flat configuration to confine the motion of the fiber to a single plane.

13. A solid state accelerometer, comprising:
(a) a light source means for providing a light beam input;
(b) a magnetically coated optical fiber connected to the light source means for receiving the light beam input;
(c) a beam splitter connected to the optical fiber for splitting the light beam input into a plurality of light beams;
(d) a plurality of magnetically coated optical fibers connected to the beam splitter for receiving the plurality of light beams;
(c) a plurality of support means for suspending each of the plurality of optical fibers between two points under a predetermined tension;
(d) a plurality of coils having a oscillating voltage connected thereto for vibrating each of the plurality of magnetically coated optical fibers at a frequency f between the two points of the support means; and
(e) a detection means for detecting acceleration induced amplitude modulation of the plurality of light beams at the output of the plurality of optical fibers including electrical circuitry means for indicating the quantity of acceleration present as a function of amplitude.

14. A solid state accelerometer as recited in claim 13 wherein the plurality of magnetically coated optical fibers have a generally flat configuration to confine the motion of the fiber to a single plane.

15. A solid state accelerometer, comprising:
(a) a light source means for providing a light beam input;
(b) a magnetically coated optical fiber connected to the light source means for receiving the light beam input;
(c) a plurality of support means for suspending the magnetically coated optical fiber between multiple points of the fiber under a predetermined tension;
(d) a plurality of coils having an oscillating voltage connected thereto for vibrating the magnetically coated optical fiber in orthogonal planes at a frequency f between the multiple points of the plurality of support means; and
(e) a detection means for detecting acceleration induced amplitude modulation of the light beam at the output of the optical fiber including electrical circuitry means for indicating the quantity of acceleration present as a function of amplitude.

16. A solid state accelerometer as recited in claim 15 wherein the magnetically coated optical fiber has a generally flat configuration to confine the motion of the fiber to a single plane.

17. A solid state accelerometer and gyro combination, comprising:
(a) a light source means for producing a beam of light;
(b) a first beam splitting means for splitting the beam of light into a path comprising a gyro loop and a path comprising an accelerometer loop;
(c) a second beam splitting means for splitting the beam of light in the gyro loop into second and third beams of light and recombining the second and third beams into a fourth beam of light;

(d) an optical fiber loop connected to the second beam splitting means for directing the second and third beams of light in opposite directions along a path about a predetermined axis about which rotation is be measured in a counterpropagating light path for the second and third light beams;

(e) a first sensing optical fiber wound in a coil about a predetermined axis for establishing the counterpropagating light path about which rotation is to be measured, the optical fiber having first and second ends, and coupling means for applying the second and third beams of light to the first and second fiber ends respectively;

(f) a phase modulator means connected to the optical fiber loop for creating a nonreciprocal phase shift between the second and third light beams;

(g) a magnetically coated second sensing optical fiber connected to the first beam splitting means comprising the accelerometer loop;

(h) a pair of coils mounted in close proximity to the magnetically coated optical fiber;

(i) a oscillating voltage means connected to the pair of coils for vibrating the magnetically coated optical fiber at a frequency f between the two points of the support means; and (j) a detection means for detecting rotation and acceleration induced amplitude modulation of the light beams in the first and second sensing fiber including electrical circuitry means for indicating the quantity of rotation and acceleration present as a function of amplitude.

18. A solid state accelerometer and gyro combination as recited in claim 17 wherein the magnetically coated sensing optical fiber has a generally flat configuration to confine the motion of the fiber to a single plane.

19. A solid state accelerometer and gyro combination as recited in claim 18 wherein the magnetically coated fiber is coated with ferrous oxide.

20. A solid state accelerometer, comprising:
(a) a light source means for providing a light beam input;
(b) an electrically conductively coated optical fiber connected to the light source means for receiving the light beam input;
(c) a support means for suspending the electrically conductively coated optical fiber between two points under a predetermined tension;
(d) permanent magnets mounted so that a magnetic field is placed across the optical fiber between the two points of predetermined tension;
(e) an oscillating current means connected to the electrically conductively the optical fiber for vibrating the fiber at a frequency f between the two points of the support means; and
(f) a detection means for detecting acceleration induced amplitude modulation of the light beam at the output of the optical fiber including electrical circuitry means for indicating the quantity of acceleration present.

21. A solid state accelerometer as recited in claim 20 wherein the electrically conductively coated optical fiber has a generally flat configuration to confine the motion of the fiber to a single plane.

22. A solid state accelerometer, comprising:
(a) a light source means for providing a light beam input;
(b) an optical fiber connected to the light source means for receiving the light beam input;
(c) a support means for suspending the optical fiber between two points under a predetermined tension;
(d) a pair of electrodes mounted in close proximity to the optical fiber such that the longitudal axis of the optical fiber is within the plane of the electrodes;
(e) an oscillating voltage means connected to the pair of electrodes for vibrating the optical fiber at a frequency f between the two points of the support means; and
(f) a detection means for detecting acceleration induced amplitude modulation of the light beam at the output of the optical fiber including a synchronous demodulator means at the output of the detector means that feeds back the acleration induced amplitude modulation of the light beam to counterbalance the deflection due to the oscillating voltage means and the voltage required to null out the acceleration induced defection is the output of the device that indicates the quantity of acceleration present.

23. A solid state accelerometer as recited in claim 22 wherein the second sensing optical fiber has a generally flat configuration to confine the motion of the fiber to a single plane.

24. A solid state accelerometer, comprising:
(a) a light source means for providing a light beam input;
(b) an optical fiber connected to the light source means for receiving the light beam input;
(c) a support means for suspending the optical fiber between two points under a predetermined tension;
(d) a pair of electrodes mounted in close proximity to the optical fiber such that the longitudal axis of the optical fiber is within the plane of the electrodes;
(e) an oscillating voltage means connected to the pair of electrodes for vibrating the optical fiber at a frequency f between the two points of the support means; and
(f) a detection means for detecting acceleration induced amplitude modulation of the light beam at the output of the optical fiber including a first and second synchronous demodulator means connected in parallel to the output of the detection means and a normalization circuit means disposed such that the second harmonic of the drive frequency f is used as a normalization factor for the signal frequency providing a normalized output that indicates the quantity of acceleration present.

25. A solid state accelerometer as recited in claim 24 wherein the second sensing optical fiber has a generally flat configuration to confine the motion of the fiber to a single plane.

26. A solid state accelerometer, comprising:
(a) a light source means for providing a light beam input;
(b) an optical fiber connected to the light source means for receiving the light beam input;
(c) a support means for suspending the optical fiber between two points under a predetermined tension;
(d) a pair of electrodes mounted in close proximity to the optical fiber such that the longitudal axis of the optical fiber is within the plane of the electrodes;
(e) an oscillating voltage means connected to the pair of electrodes for vibrating the optical fiber at a frequency f between the two points of the support means; and
(f) a detection means for detecting acceleration induced amplitude modulation of the light beam at the output of the optical fiber including a first and second synchronous demodulator means, a scale factor correction oscillation means connected in parallel to the output of the detection means and a normalization circuit means disposed such that the first harmonic of frequency s of the scale factor correction oscillator means is fed back to the oscillating voltage means maintaining the drive frequency of the fiber at its peaked resonance and providing a normalized output that indicates the quantity of acceleration present.

27. A solid state accelerometer as recited in claim 26 wherein the second sensing optical fiber has a generally flat configuration to confine the motion of the fiber to a single plane.

* * * * *